United States Patent [19]
Spanke

[11] 3,963,136
[45] June 15, 1976

[54] RETRACTABLE LADDER RACK

[76] Inventor: Theodore J. Spanke, 1834 Dracena, Bakersfield, Calif. 93304

[22] Filed: Jan. 10, 1975

[21] Appl. No.: 540,153

[52] U.S. Cl. .......................... 214/450; 224/42.1 H
[51] Int. Cl.² ........................................... B60R 9/00
[58] Field of Search ............... 214/450; 224/42.1 H, 224/42.1 F, 42.1 E

[56] References Cited
UNITED STATES PATENTS

| | | | |
|---|---|---|---|
| 2,654,515 | 10/1953 | Svoboda | 224/42.1 H |
| 2,715,974 | 8/1955 | Van Nest | 214/450 |
| 2,828,035 | 3/1958 | Kuchinskie | 224/42.1 H |
| 3,013,681 | 12/1961 | Garnett | 214/450 |
| 3,282,455 | 11/1966 | Demarais | 214/450 |
| 3,452,893 | 7/1969 | Heflin | 214/450 |
| 3,826,390 | 7/1974 | Watson | 214/450 |

Primary Examiner—Robert J. Spar
Assistant Examiner—Ross Weaver
Attorney, Agent, or Firm—Edgar W. Averill, Jr.

[57] ABSTRACT

A retractable ladder rack for use on the top of vehicles. The rack has one or more curved C-shaped channel members which can be attached to the roof of the vehicle and which hold antifriction members such as wheels which in turn suppot a rack. The rack can slide along the channel members to a lower position to facilitate the loading of a ladder or other object. The rack may be equipped with spring means to facilitate upward movement. The rack has at least three anti-friction members which are positioned within the channel, at least two of which are retained in the channel when the rack is in its maximum downward position. The retained members are positioned in close proximity to each other so that when the rack is extended said rack moves downwardly and toward the side of the vehicle and is supported only by its retained members. The extent of the movement toward the side of the vehicle may be made adjustable.

16 Claims, 11 Drawing Figures

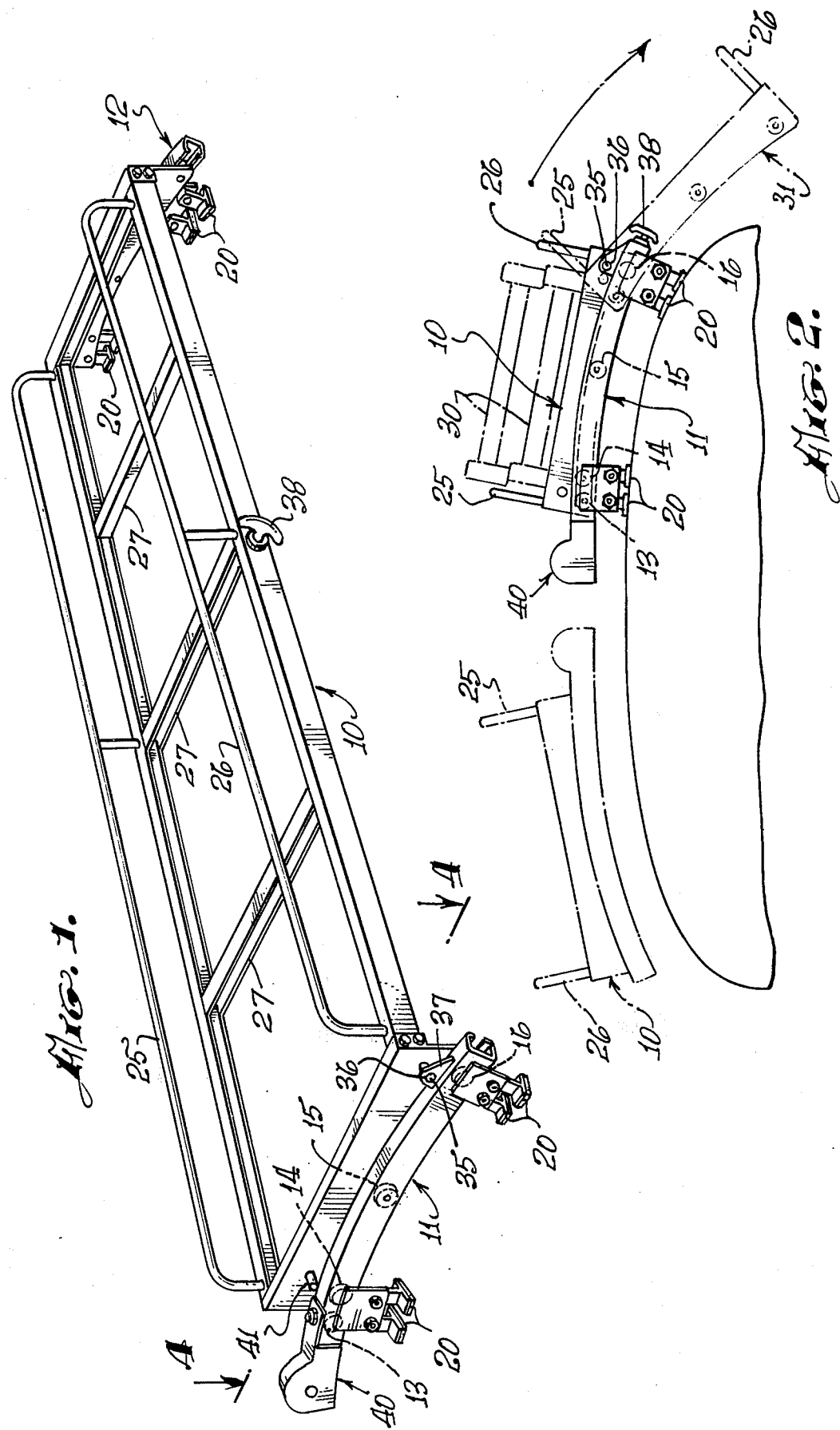

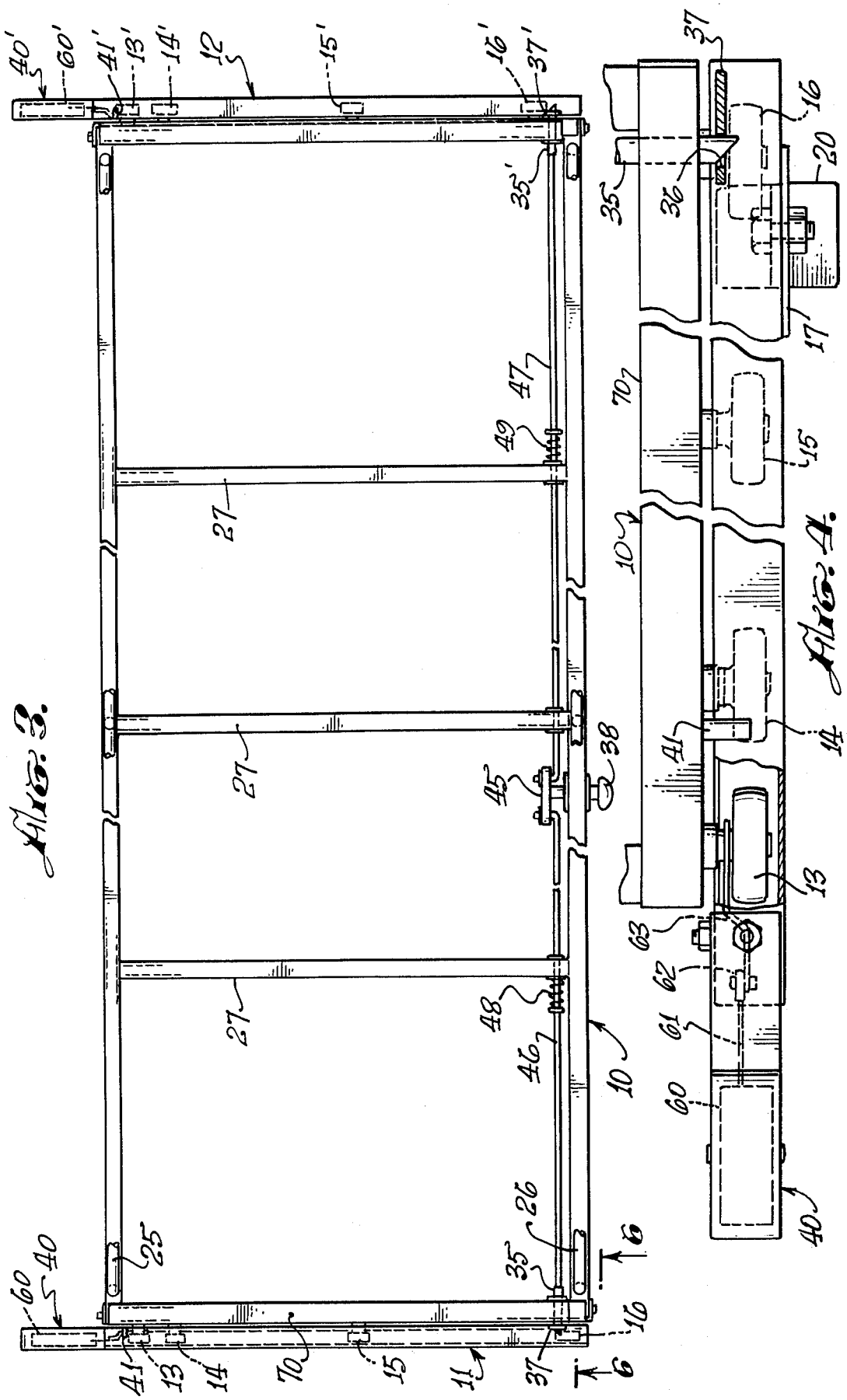

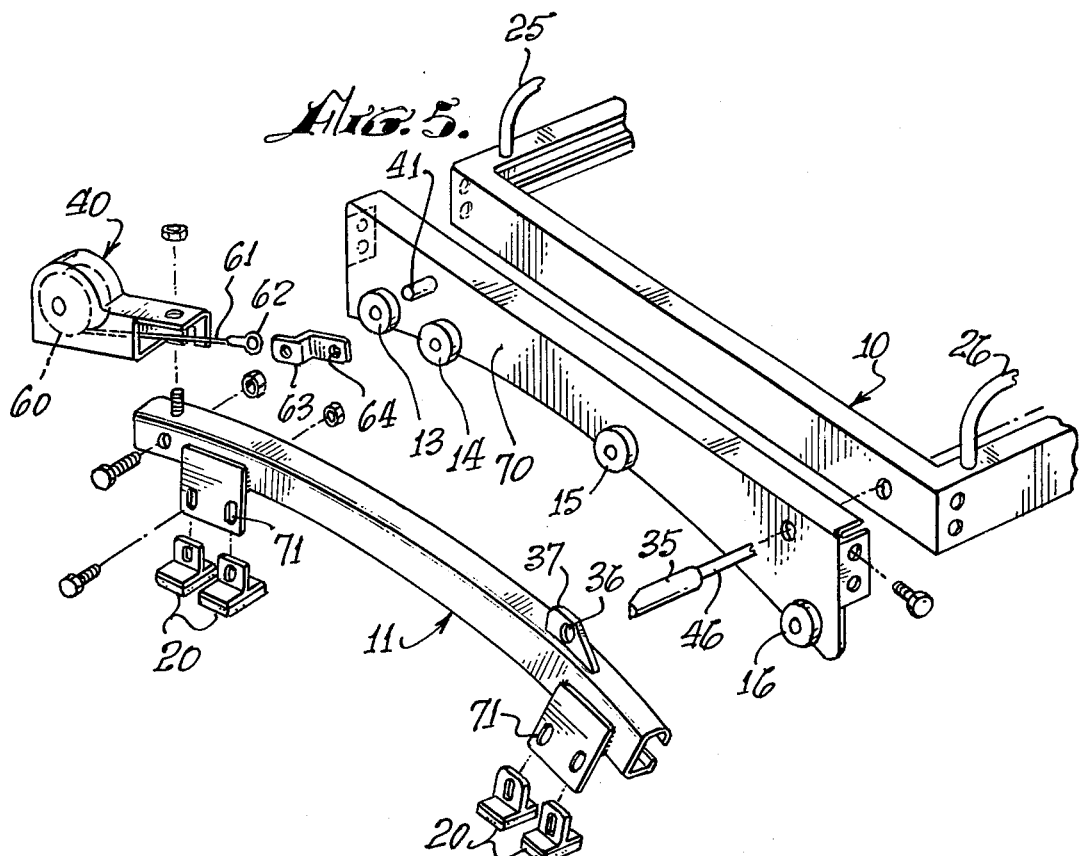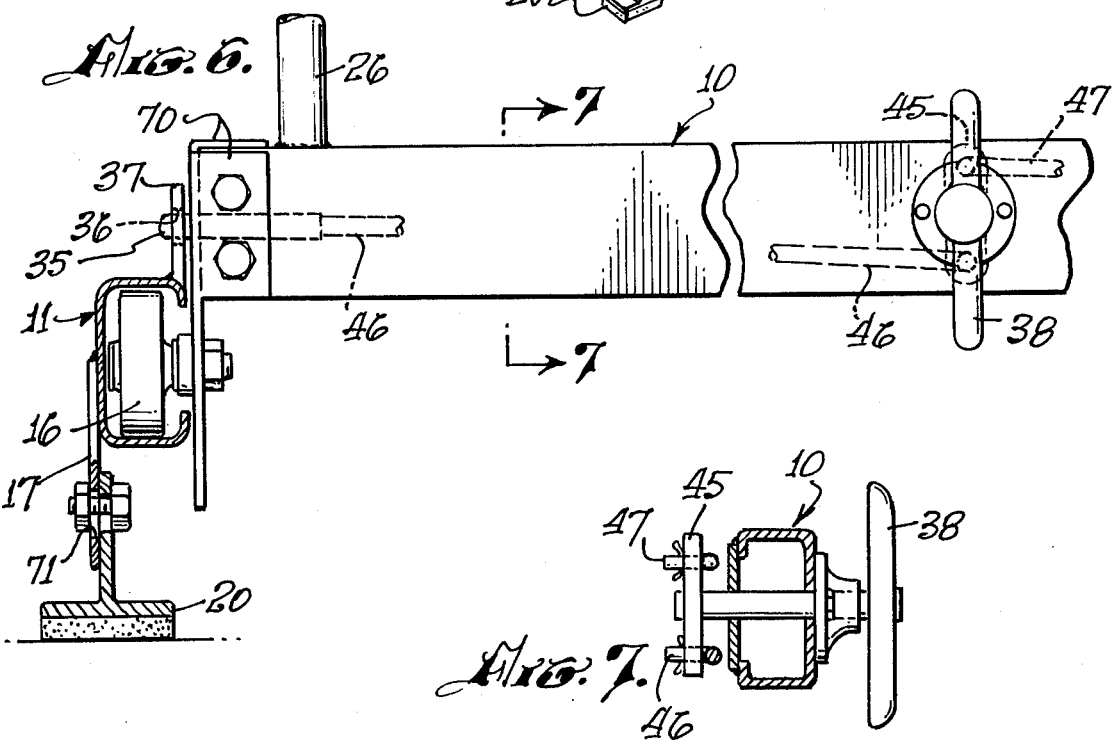

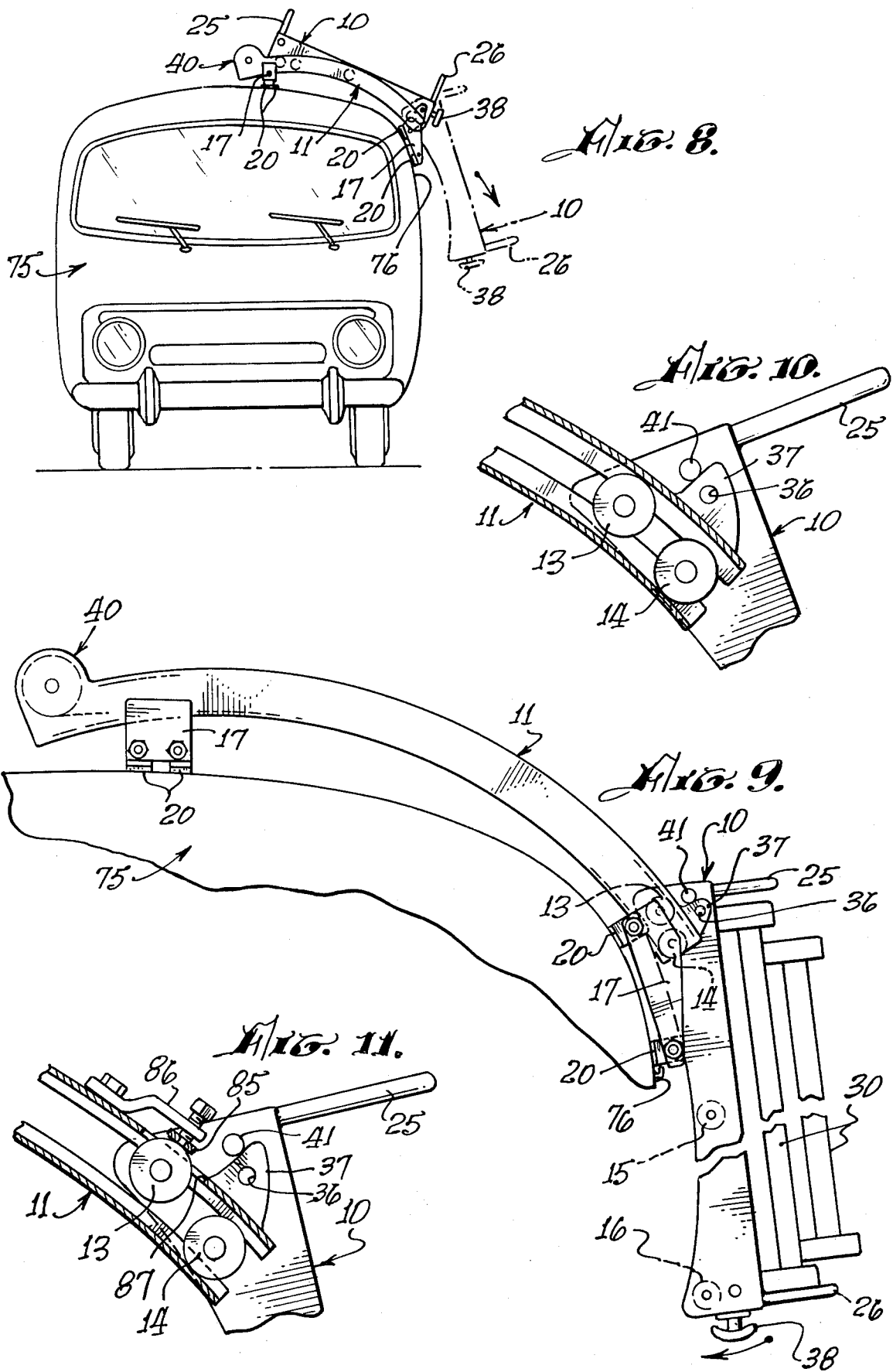

RETRACTABLE LADDER RACK

BACKGROUND OF THE INVENTION

The field of the invention is vehicle racks for carrying objects such as ladders, boats, luggage, surfboards and the like on top of cars, trucks, and other vehicles.

A particularly common use for such racks is the carrying of wooden ladders and numerous devices have been used for this purpose. Because of the weight of wooden ladders, particularly extension ladders, occasional back injury results from lifting ladders to the top of a vehicle. While light weight aluminum ladders have found wide acceptance for many uses, they present a safety hazard resulting from their property of electrical conductivity. For this reason, wooden and other heavy ladders will continue to be used. Other objects such as boats and luggage present this same hazard when lifted.

A ladder rack for vehicles is shown in U.S. Pat. No. 3,013,681 where a hinged support structure aids in lifting the ladder. Racks of this type often interfere with the accessibility to side doors of the vehicle. Furthermore, racks of this type are not well suited for vans or other vehicles which do not have space for the required support structure.

While it is relatively easy to lift even a heavy wooden ladder to about shoulder height, it becomes difficult and can cause back injury when one attempts to lift a heavy ladder above this height. Thus, the standard stationary rack widely used on automobiles and other vehicles is not suitable for wooden ladders and other relatively heavy objects.

Racks of the prior art have either not been retractable to facilitate loading, have limited access to side doors, or have not been useable on the top of vans or other vehicles which do not have sufficient space for support structure below the rack.

SUMMARY OF THE INVENTION

It is thus an object of the present invention to provide a retractable ladder rack which facilitates the loading of a ladder while not interfering with side entry into the vehicle.

The present invention is for a retractable ladder rack for use on the top of vehicles. The rack has one or more curved rail members which are affixed to the top of the vehicle, antifriction members ride on the rails and support a rack which thus may be moved along the rails. The rack may have spring means to help the movement of the rack to its retracted position. The rail members may be open at one end to permit a portion of the rack to move beyond the open end of the rail. Preferably the rail is a channel member and the antifriction members are wheels. By positioning a pair of wheels near the inside end of the rack and providing a stop which retains the pair of wheels within the rails, the rack may be partially lowered towards the side of the vehicle when in its fully extended position. An opening may be provided in the rails to further facilitate the downward movement of the rack in its fully open position. Adjustment means may be provided to adjustably limit the amount that one of the retained wheels may be moved upwardly or downwardly. The use of spring means and an arcuate shaped rail results in a particularly effective structure.

BRIEF DESCRIPTION OF THE DRAWINGS

FIG. 1 is a perspective view of the rack in a retracted position.

FIG. 2 is an end elevation of the rack of FIG. 1.

FIG. 3 is a top plan view of the rack of FIG. 1.

FIG. 4 is an enlarged fragmentary view along line 4—4 of FIG. 1.

FIG. 5 is an exploded perspective view of the components shown in FIG. 4.

FIG. 6 is a view taken along line 6—6 of FIG. 3.

FIG. 7 is a cross sectional view taken along line 7—7 of FIG. 6.

FIG. 8 is an end view of an alternate configuration of the rack mounted on a vehicle.

FIG. 9 is an enlarged view of the rack of FIG. 8 in an open position.

FIG. 10 is a cut away enlarged view of the open end of the channel of the rack of FIG. 8.

FIG. 11 is a cut away enlarged side view of an alternate configuration of the open end of the channel of the rack of FIG. 8.

DESCRIPTION OF THE PREFERRED EMBODIMENTS

A retractable ladder rack is shown in perspective view in FIG. 1. The frame 10 is supported by a pair of rails 11 and 12. Rails 11 and 12 are channel shaped in cross section and permit a plurality of rollers 13 through 15 to pass along its interior. Rails 11 and 12 are supported to the top of the vehicle by support brackets 17 each of which have a pair of mounting pads 20. The brackets are conventional and may be replaced by other mounting methods known to those skilled in the art. Since the frame does not extend any substantial distance below rails 11 and 12, a wide variety of mounting methods are possible with the rack of the present invention. Because of this lack of downward protrusion, the rack may be mounted directly on the top of a van, station wagon or other vehicle and is not limited to vehicles having an open space below the rack.

Frame 10 has a pair of support rails 25 and 26 which may be used to facilitate tying down or otherwise holding the ladder or other object placed on the rack. Three cross rails 27 are shown on the frame 10 to assist in supporting the ladder. If other objects such as luggage were to be carried, a plywood or other floor could be provided in place of or in addition to the cross rails.

A pair of ladders 30 is shown in dotted lines in FIG. 2. The rack is shown in unloading position in dotted lines in FIG. 2, and is indicated generally by reference character 31. In this position, rollers or wheels 15 and 16 have passed through the open end of rail 11 and the corresponding rollers have passed through the open end of rail 12, not shown in FIG. 2. The downward movement of the frame 10 is controlled by the movement of rollers 13 and 14 in rail 11 and the corresponding movement of the last two rollers located in rail 12. This movement will be described more fully below.

Means should be provided to hold the rack in a retracted position. One such means is shown in FIG. 1 where a lock pin 35 projects through an opening 36 in stop 37. Release handle 38 causes lock pin 35 to retract to permit movement of frame 10 along rails 11 and 12. Loading of heavy objects such as wooden ladders is facilitated by the use of a spring assembly 40 which has a spring loaded cable which is attached to roller 13 in a manner described below. As can be readily seen from FIG. 1 and from FIG. 2, the side of the van is readily accessible when the frame 10 is in a closed or retracted position. The downward movement of frame 10 is limited by stop pin 41 which abuts stop 37 in a manner shown in dotted lines in FIG. 2.

The ladder rack is shown in plan view in FIG. 3 where the operation of the stop pin is more clearly shown. Release handle 38 is attached to arm 45 which causes rods 46 and 47 to retract when release handle 38 is turned. Springs 48 and 49 hold the lock pins 35 and 35' in a closed position. The stop, lock pin and rollers have been given corresponding reference characters to those of rail 11 followed by a prime.

The spring assembly 40 is shown in enlarged view in FIG. 4 where a cable drum 60 is shown in dotted lines. The drum holds a cable 61 which is attached to the axle of roller 13 in a manner more clearly shown in exploded view in FIG. 5.

As shown in FIG. 5, cable 61 is affixed to eye 62 which in turn is affixed to link 63. Opening 64 in link 63 is placed over the axle of wheel 13. Wheel support member 70 is bolted to frame 10 and serves to support wheels 13 through 15 and stop pin 41. Elongated slots 71 are provided in support brackets 17 and 18 to permit adjustment of mounting pads 20 to conform to the surface to which the assembly is attached.

Turning now to FIG. 8, the ladder rack of the present invention is shown mounted on a van. As can be readily seen from FIG. 8, the radius of curvature of the rail may be decreased to cause the extended rack to be closer to the side of the vehicle or van which is indicated by reference character 75. An important feature of the rack of the present invention is its ability to be lowered close to the side 76 of the van 75 when in a retracted position. The rack does not in any way interfere with doors, windows, or the like along side 76 of the van. By the relative size of the inside of rail 11 and wheels 13 and 14, the downward movement of the frame 10 is affected. Furthermore, the spacing between the axles of wheels 13 and 14 affect this last two wheels 13 and 14 within the rail. The same reference characters have been used in FIGS. 8 and 9 as the like elements in the other figures. The radius of curvature is smaller and the brackets have been relocated but the basic structural elements are the same.

A further adjustment may be provided as shown in FIG. 11 where ad adjustable stop 85 is held in bracket 86 which is bolted to rail 11. An opening 87 is provided in the upper surface of rail 11 to permit wheel 13 to extend above the upper surface of rail 11. Alternatively, the opening could be placed in the bottom of rail 11 and adjustable means provided below rail 11 to limit the downward movement of wheel 14. By such adjustment, it is possible to adapt the rack to the particular vehicle on which it is used thereby allowing the frame 10 to move close to the side 76 of the vehicle without touching same. When the rack is in its lowered position, a ladder 30 may be readily loaded on to the frame by simple lifting it to the desired height without the necessity of having to hold it outwardly and away from the user which would be necessary if the rack were affixed on top of the vehicle.

The radius of curvature of the rail and the wheel support member is an important feature of the present invention. It has been found that a radius between 24 and 48 inches is satisfactory for most vehicles with approximately 36 inches being preferred. Each wheel support member should have at least two wheels and preferably three with two of the three wheels being "retained wheels". The term retained wheels is intended to indicate that the wheels are retained in the track even though the rack is in its open position. When there are two retained wheels they should preferably be close to each other near the inner edge of the wheel support member. The spacing of these two retained wheels significantly affects the downward movement of the rack when in its opened position. Spacings between 1 and 4 inches are useful with 2 inches being preferred. The downward movement is affected by the inside height of the rail as well as the provision of any adjustable stops such as that indicated by reference character 75 in FIG. 11.

A particularly stable configuration of the rack results when the high point of the rail is located away from the center line of the vehicle. This configuration is shown in FIGS. 8 and 9. In this way, the ladder or other object has little or no tendency to move toward an unloading position and there is no continuous strain on whatever stop means is used to hold the ladder in its closed configuration. Further, this configuration permits a more curved arc resulting in the open rack being located closer to the side of the vehicle.

While the above description refers to wheels riding in a C-shaped channel, this antifriction combination may of course be replaced by other sliding means. While the device has been shown with a pair of curved support rails, a single support rail could be utilized or more than two rails could also be used. When a spring assembly is utilized it is advantageous to provide some means for holding the frame in an unloading configuration. Release handle 38 may be provided with a second retractable pin for this purpose or other conventional latches could alternatively be used. Materials of construction may be aluminum, steel, plastic, or any material having the requisite strength and corrosion resistance.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A retractable ladder rack assembly for use on the top of vehicles, said rack assembly comprising:
a curved rail comprising a C-shaped channel member having a first end and a second open end;
means for attaching said channel member to the top of the vehicle;
at least three anti-friction members adapted to ride in said channel and positioned so that said anti-friction members are within said channel member when said rack is in a retracted position and so that at least two but not all of said anti-friction members remain within said channel member when said rack is in an extended configuration, the members remaining within said channel being retained members, said retained members being in close proximity to each other;
a rack supported by said anti-friction members and said channel member to permit movement along said channel member from the first end thereof to and partially past the second end thereof when said rack is moved from its retracted position to its extended configuration; and spring means attached to said rack by flexible cable means positioned within said channel and urging said rack towards the first end of said channel member.

2. The rack of claim 1 further including at least one additional curved channel member.

3. The rack of claim 2 having two curved channel members.

4. The rack of claim 1 wherein the entire length of said channel members is curved.

5. The rack of claim 4 wherein the curve in said channel member is arcuate.

6. The rack of claim 5 wherein the radius of curvature of said channel member is between about 24 and 48 inches.

7. The rack of claim 6 wherein the raidus of curvature of said rail member is about 36 inches.

8. A retractable ladder rack assembly affixed to the top of a vehicle, said rack assembly comprising:

attachment means affixed to the top of a vehicle;

curved rail means comprising a C-shaped channel member supported by said attachment means said channel member having at least one open end;

at least three anti-friction members positioned within said channel member and adapted to ride lengthwise thereof, and located so that at least one anti-friction member passes through said open end and at least two anti-friction members comprise retained members which are held within said channel member when said rack is in an extended configuration, said retained members being in close proximity to each other; and a rack supported by said anti-friction members, said rack being movable from the first end of said rail means, and a portion thereof moving past the open end of said rail means whereby the retained members contact the upper and lower surface of the C-shaped channel member when said frame is in an extended configuration allowing said frame to move downwardly.

9. The rack of claim 8 wherein said antifriction members are wheels.

10. The rack of claim 8 wherein said anti-friction members are wheels and each rail means has two retained wheels and the axis of said retained wheels are spaced between 1 and 4 inches apart.

11. The rack of claim 10 wherein said retained wheels are spaced about 2 inches apart.

12. The rack of claim 10 further including at least one opening in said rail means positioned near the open end of said rail means to permit one of said retained wheels to protrude partially through said C-shaped channel.

13. The rack of claim 12 further including adjustable means to adjustably limit the amount of said protrusion.

14. The rack of claim 8 further including spring means urging said rack toward a closed position.

15. The rack of claim 14 wherein said spring means is a coiled spring which is affixed to said rack by a cable positioned in said C-shaped channel.

16. The rack of claim 8 wherein the maximum height of said curved rail means is spaced away from the first end of said rail means when said rack is affixed to the top of a vehicle.

* * * * *